United States Patent [19]
Busick et al.

[11] Patent Number: 6,089,258
[45] Date of Patent: Jul. 18, 2000

[54] FLOAT VALVE ASSEMBLY FOR A WATER PURIFICATION SYSTEM

[75] Inventors: Louis M. Busick; Galen L. Gerig, both of Columbus, Ohio

[73] Assignee: Oasis Corporation, Columbus, Ohio

[21] Appl. No.: 09/270,955

[22] Filed: Mar. 17, 1999

[51] Int. Cl.[7] .............................. F16K 31/24; F16K 33/00
[52] U.S. Cl. ......................... 137/422; 137/423; 137/448; 210/123; 210/134; 210/321.72; 251/65
[58] Field of Search ..................................... 137/416, 418, 137/419, 422, 423, 448; 210/110, 123, 134, 321.72; 251/65

[56] References Cited

U.S. PATENT DOCUMENTS

| | | | |
|---|---|---|---|
| 1,316,843 | 9/1919 | Lytton | 137/419 |
| 1,528,842 | 3/1925 | O'Harrow | 137/419 |
| 1,894,367 | 1/1933 | Corcoran | 137/416 |
| 4,436,109 | 3/1984 | Taylor | 137/448 |
| 4,577,657 | 3/1986 | Alexander | 137/448 |
| 4,776,952 | 10/1988 | Burrows | 210/110 |
| 5,045,197 | 9/1991 | Burrows | 210/321.78 |

*Primary Examiner*—George L. Walton
*Attorney, Agent, or Firm*—Kelly Bauersfeld Lowry & Kelley, LLP

[57] ABSTRACT

An improved float valve assembly is provided for regulating water inflow to a purification module of a water purification system, such as a reverse osmosis purification module or the like. The float valve assembly is mounted within a reservoir for receiving and storing relatively purified water produced by the purification module, and includes a valve unit defining a vertically extending flow path from a tap water source to the purification module. A primary float carried on a float arm responds to rising and falling water level within the reservoir for respectively closing and opening a primary banjo valve mounted along the flow path. An over-center switch provides snap-action closure of the primary valve in response to rising water level, and the primary float is mounted on the float arm for a limited range of lost motion to accommodate this snap-action valve closure. A secondary banjo valve is mounted along the flow path at a location above the primary valve, and, in the event of primary valve malfunction, is closed by a secondary float carried on a float arm and responsive to rising reservoir water level. In a preferred form, the secondary valve remains closed upon subsequent descent of the water level, and is manually re-opened by depression of a reset button.

25 Claims, 7 Drawing Sheets

FLOAT VALVE ASSEMBLY FOR A WATER PURIFICATION SYSTEM

BACKGROUND OF THE INVENTION

This invention relates generally to improvements in water purification systems of the type including a purification element or module for producing a supply of relatively purified water which is stored in a reservoir for convenient dispensing through a faucet valve or the like. More particularly, this invention relates to an improved mechanical float valve assembly for controlling water inflow to the purification element or module in response to the water level within the storage reservoir.

Water purification systems of the type including one or more purification elements or modules in the form of filters and/or reverse osmosis units are generally well known in the art for producing a relatively purified water supply used for drinking, cooking, etc. For example, such purification systems commonly include a reverse osmosis filter or membrane which, in the presence of appropriate flow and pressure conditions, separates an incoming tap or feed water supply into the purified water supply and a relatively impure or reject water supply. In particular, the reverse osmosis membrane functions to remove particulate matter and a wide range of dissolved solids and other contaminants from a portion of the tap water inflow, and to concentrate those contaminants within the reject water supply, often referred to as brine, for waste disposal via a suitable drain. The purified water supply is normally collected for storage within a reservoir, and for ready dispensing on demand through a faucet valve or the like.

One potential disadvantage associated with reverse osmosis purification systems relates to the inherent waste of at least a portion of the tap water inflow, by virtue of the flow of the concentrated brine water to the drain site. This disposal of a portion of the tap water inflow is generally acceptable during normal system operation to produce purified water, during filling of the storage reservoir. However, when the reservoir reaches a filled or substantially filled condition, there is typically at least some continued flow of water through the reverse osmosis membrane to the drain, wherein the amount of water wasted during this condition can be significant and undesirable.

In the past, reverse osmosis purification systems have been designed to include a tap water inflow control valve responsive to filling of the storage reservoir, in order to reduce excessive water waste. More specifically, purification systems have been developed to incorporate a shut-off valve responsive to the pressure within a pressurized storage reservoir to halt tap water inflow to the system when the reservoir is filled. See, for example, U.S. Pat. No. 4,776,952. Other purification systems of the type having an unpressurized storage reservoir have included float-operated solenoid valves responsive to reservoir water level to halt tap water inflow when the reservoir reaches a substantially filled condition. Such electric solenoid devices are, however, relatively costly and include metal components which are conducive to corrosion-caused malfunction resulting in reservoir overflows.

Mechanical float valve arrangements have been proposed for regulating tap water inflow to the purification system. See, for example, copending U.S. Ser. No. 09/141,293, filed Aug. 27, 1998. Such mechanical float valve arrangements utilize a float mounted at the end of a lever arm or the like for shifting a tap water inflow control valve toward a closed position in response to rising water level within a storage reservoir, and to permit re-opening of the control valve in response to a falling water level within the reservoir when water is dispensed therefrom. However, in a reverse osmosis type purification system, the control valve is displaced slowly toward the closed position, resulting in a progressive reduction in the water pressure and flow rate applied to the reverse osmosis purification membrane. In some instances, the water pressure and flow rate will fall sufficiently to preclude further production of purified water for filling the reservoir while continuing to permit a slow flow past the reverse osmosis membrane to the drain. As a result, a further rise in the reservoir water level is prevented so that the inflow control valve is never fully closed and a substantial amount of water can be wasted.

The present invention relates to an improved and relatively cost efficient yet highly reliable mechanical float valve assembly for use in regulating tap water inflow to a purification system in response to the water level within a storage reservoir. The improved float valve assembly of the present invention incorporates an over-center switch means for achieving a substantially snap-action full closure of a tap water inflow control valve in response to rising water level within the reservoir.

SUMMARY OF THE INVENTION

In accordance with the invention, an improved float valve assembly is provided for controlling water inflow to a water purification system, such as a purification system including a reverse osmosis module, in response to the water level within a storage reservoir. The float valve assembly comprises a valve unit having a housing defining a flow path from a tap water supply or the like to the reverse osmosis module, with a pair of primary and secondary valves mounted in series along said flow path. The primary and secondary valves are respectively operated by primary and secondary floats positioned within the reservoir for vertical displacement in response to rising and falling reservoir water level. The primary valve provides primary on-off regulation of water inflow to the purification module, and an over-center switch is provided for positive and substantially snap-action closure of the primary valve when the reservoir is full. The secondary valve provides a backstop shut-off function in the event of primary valve malfunction.

In the preferred form, the flow path extends vertically through the valve unit housing, and the primary and secondary valves are mounted along said flow path so that the primary valve is disposed vertically below the secondary valve. With this geometry, the primary valve is operated by the associated primary float to provide normal on-off regulation of water inflow to the purification module while the secondary valve remains in an open position. In the event of primary valve malfunction, the reservoir water level will rise at least slightly above an upper limit sufficient to otherwise close the primary valve, whereupon the secondary float responds to such increased water level to displace the secondary valve to the closed position. In one preferred arrangement, a valve seat associated with the secondary valve is sized to insure that the secondary valve remains in the closed position in response to tap water pressure, upon subsequent descent of the reservoir water level, and a manually operable reset button is provided for manually re-opening the secondary valve.

The primary and secondary valves comprise a pair of banjo valves in association with a respective valve seat. Each banjo valve comprises a central valve disk or head coupled by a radial arm with an annular seal ring seated coaxially along the flow path through the valve unit. The associated float comprises a buoyant float member mounted at an outboard end of a float arm, which in turn has an inboard end extending through the annular seal ring and related radial arm to the valve head. When the water level within the reservoir rises sufficiently to elevate the buoyant float member and thereby move the associated float arm to a substantially horizontal orientation relative to the valve unit housing, the inboard end of the float arm carries the associated valve head to the closed position. Conversely, when the reservoir water level falls causing the buoyant float member to descend so that the associated float arm extends angularly outwardly and downwardly from the valve unit housing, the inboard end of the float arm pivots the associated valve head sufficiently to unseat and move to the open position.

The over-center switch associated with the primary valve comprises, in the preferred form, a magnetic switch unit including a first magnet carried by the associated float arm and at least one second magnet mounted on the valve unit housing. The first and second magnets are arranged in horizontally and relatively closely spaced relation, with like poles presented toward each other so that magnetic repulsion forces resist upward displacement of the float arm magnet to an on-center position aligned horizontally with the second magnet on the valve unit housing. However, continued filling of the reservoir with the primary valve in the open position eventually applies a sufficient upward force via the float to the float arm to cause the float arm magnet to displace upwardly and over-center relative to the second magnet with a substantially snap-type action to positively close the primary valve. This upward snap-type displacement of the float arm is permitted by mounting the associated buoyant float thereon with at least some lost motion in the vertical direction. Subsequent dispensing of water from the reservoir causes the water level to descend, resulting in downward displacement of the buoyant float eventually to apply a sufficient downward force to the float arm for snap-type over-center downward motion of the float arm magnet to re-open the primary valve for resumed production of purified water.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
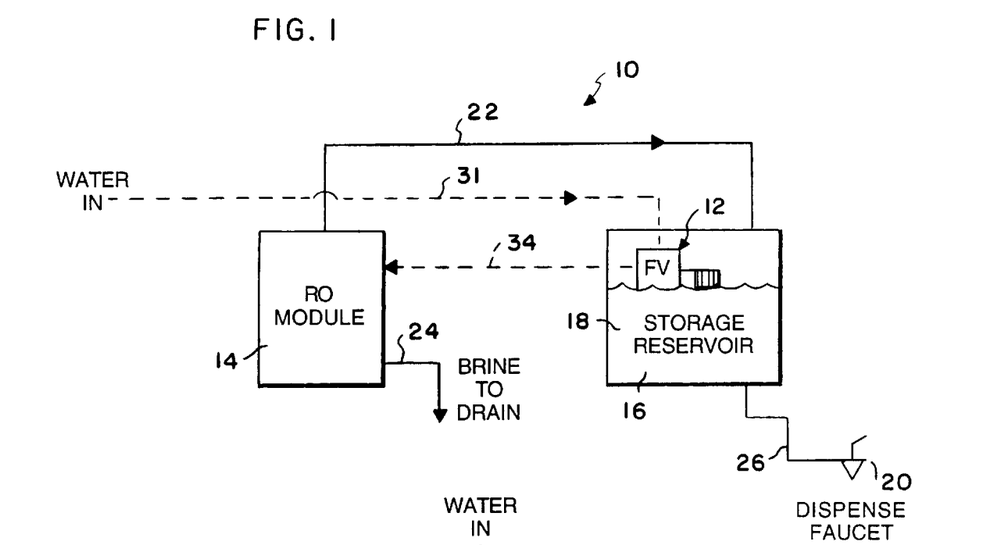
FIG. 1 is a schematic diagram of a water purification system including a reverse osmosis module, depicting use of a float valve assembly for regulating water inflow in response to the water level within a storage reservoir.

As shown in the exemplary drawings, a water purification system referred to generally in FIG. 1 by the reference numeral 10 includes an improved float valve assembly 12 for controlling water inflow to a purification or filtration element or module, such as the illustrative reverse osmosis module 14. The float valve assembly 12 is mounted within a reservoir 16 within which relatively purified water 18 produced by the reverse osmosis module 14 is collected and stored where it is ready for use by dispensing through a faucet 20 or the like. The float valve assembly 12 includes a pair of float-operated valves (not shown in FIG. 1) responsive to the water level within the reservoir 16 for on-off regulation of water inflow to the purification system. In addition, an over-center switch (also not shown in FIG. 1) is provided for positive, substantially snap-action closure of a primary float-operated valve when the reservoir water level rises to a full condition.

The water purification system 10 is designed particularly for residential and other domestic applications to provide a ready supply of relatively purified water 18 produced from ordinary tap water or the like. As is known in the art, the purification system 10 utilizes principles of filtration and/or reverse osmosis to convert the incoming tap water supply into dual water outflows comprising the relatively purified water having contaminants substantially removed therefrom, and a waste or reject water supply having the contaminants or impurities concentrated therein. The produced purified water is normally coupled by a pure water conduit 22 for flow from the reverse osmosis module 14 to the storage reservoir 16, whereas the waste or reject water is normally coupled for flow from the reverse osmosis module through a drain conduit 24 to a suitable drain. The waste or reject water is often referred to as brine. The faucet 20 is normally coupled via a dispense conduit 26 to the produced purified water, either by connection to the pure water conduit 22 or by connection directly to the reservoir 16. An additional filter element (not shown) may be provided for additional filtering of the purified water discharged from reverse osmosis module 14 to the pure water conduit 22.

One exemplary reverse osmosis purification system of this type is shown and described in more detail in U.S. Pat. No. 5,045,197, which is incorporated by reference herein.

In the illustrative purification system 10 depicted in FIG. 1, the storage reservoir 16 receives and stores the produced purified water 18 under unpressurized, substantially atmospheric pressure conditions. In this regard, the flow conduit 26 coupled to the reservoir 16 is arranged for gravity flow dispensing of the purified water 18 through the dispense conduit 26 to the faucet 20.

Figure 2:
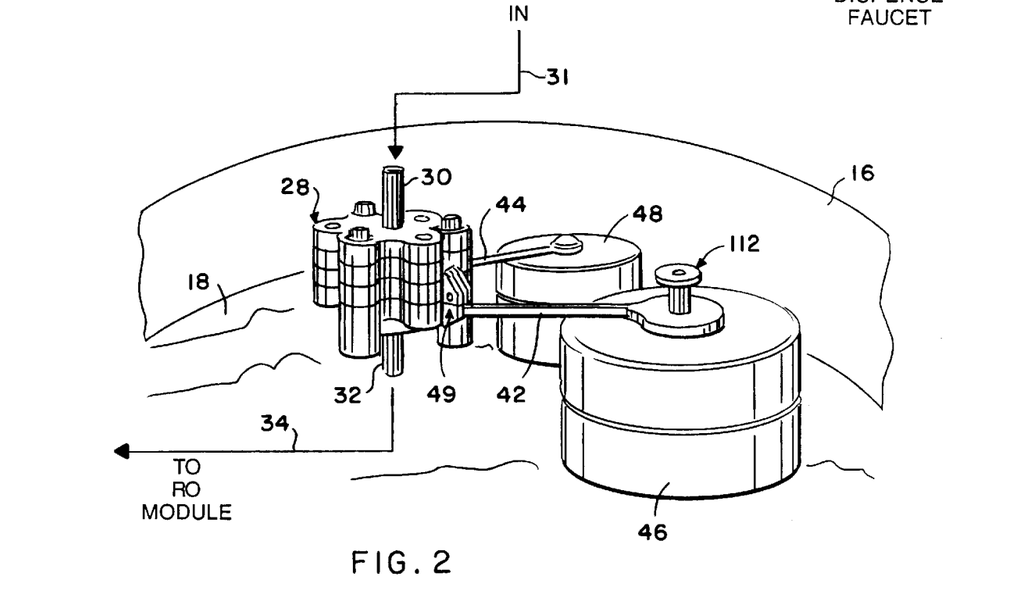
FIG. 2 is a fragmented perspective view illustrating the float valve assembly of the present invention installed within the storage reservoir.

The float valve assembly 12 of the present invention is mounted within an upper region of the reservoir 16 for float actuated response to the reservoir water level to control tap water inflow to the reverse osmosis module 14. More particularly, as viewed in FIG. 2, the valve assembly 12 generally comprises a valve unit 28 in the form of a multi-part housing having an inlet fitting 30 adapted for connection by an inflow line 31 to the tap water source, and an outlet fitting 32 coupled by a supply line 34 to the reverse osmosis module 14. When the reservoir water level is relatively low, substantially less than a filled condition, the float valve assembly 12 permits water inflow to the reverse osmosis module 14 so that production of purified water and filling of the reservoir 16 may proceed. However, as the reservoir water level reaches a filled or substantially filled condition, the float valve assembly 12 shuts off the water inflow to the system and thereby prevents potential substantial waste of water which would otherwise occur by flow through the reverse osmosis module 14 to the drain. Upon subsequent descent of the reservoir water level by dispensing a volume of the water 18 therein via the faucet 20, the float valve assembly 12 permits resumed tap water inflow to the system for resumed production of purified water.

Figure 3:
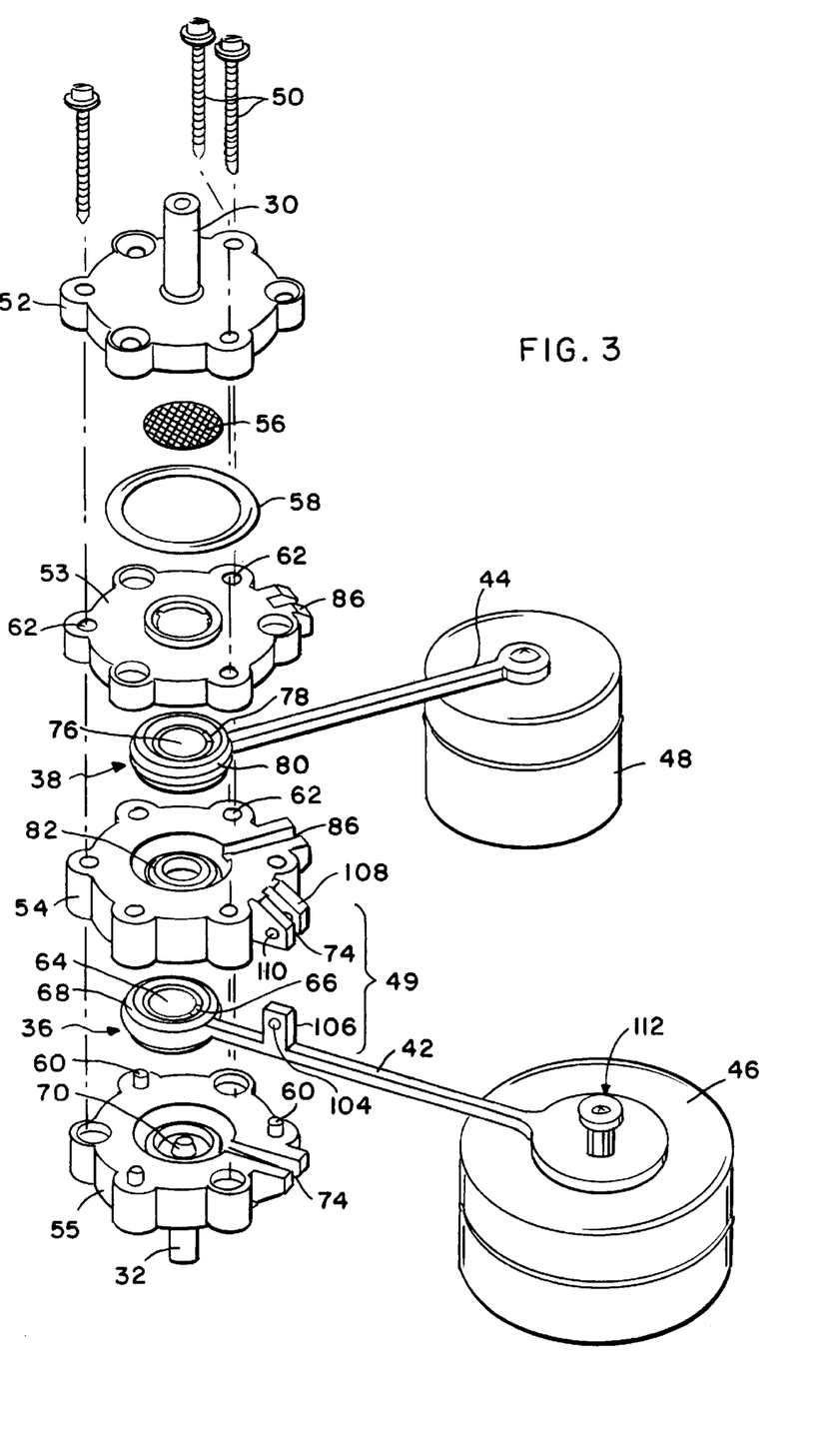
FIG. 3 is an exploded perspective view of the float valve assembly.

As shown in more detail in FIGS. 2–7, the float valve assembly 12 comprises a primary valve 36 and a secondary valve 38 (FIGS. 3 and 7) mounted in series along a flow path 40 (FIG. 7) formed in the valve unit 28 to extend generally vertically between the inlet and outlet fittings 30, 32. The two valves 36, 38 are individually and pivotally coupled to the inboard ends of a respective pair of float arms 42 and 44 which extend laterally therefrom to the exterior of the valve unit 28, terminating in outboard ends coupled respectively to a primary float 46 and a secondary float 48 (FIG. 3). In general terms, both the primary and secondary floats 46, 48 comprise buoyant members such as hollow canisters adapted to move vertically upwardly in response to a rising water level within the reservoir 16, for shifting their respective primary and secondary valves 36, 38 from an open position to a closed position along the flow path 40, all in a manner to be described in more detail. However, the secondary float 48 is positioned at a vertical elevation sufficiently above the primary float 46, so that the primary float 46 and its associated primary valve 36 provides the primary or normal on-off water flow control through the valve unit 28. The over-center switch 49 is shown best in FIGS. 3 and 11–13, and functions to insure positive closure of the primary valve 36 with a substantial snap-type action in response to the water level rising to a full condition within the reservoir. The secondary float 48 and its associated secondary valve 38 provide backstop shut-off control in the event of primary float or primary valve malfunction.

The valve unit 28 comprises a valve unit housing formed by a plurality of housing plates mounted in a stacked array by means of a plurality of screws 50 (FIG. 3 and 7) or the like. More particularly, an upper housing plate 52 includes the tubular inlet fitting 30 projecting upwardly therefrom for suitable connection to the tap water inflow line 31. This upper plate 52 is assembled in sequence with a pair of middle housing plates 53 and 54, the latter plate 54 being assembled in turn with a lower housing plate 55 defining the tubular outlet fitting 32. As shown best in FIG. 7, this assembly of housing plates 52–55 cooperatively defines the valve unit flow path 40. A strainer 56 is conveniently mounted between the upper two housing plates 52, 53 upstream from the primary and secondary valves 36, 38 to capture any large particulate which might otherwise interfere with valve unit operation. In addition, an appropriate seal ring 58 is also seated between the upper two housing plates 52, 53 to prevent water leakage therebetween. A plurality of vertically extending alignment pins 60 and related pin-receiving alignment ports 62 are formed in the housing plates 52–55 to insure correct interfitting assembly of the housing plates.

Figure 7:
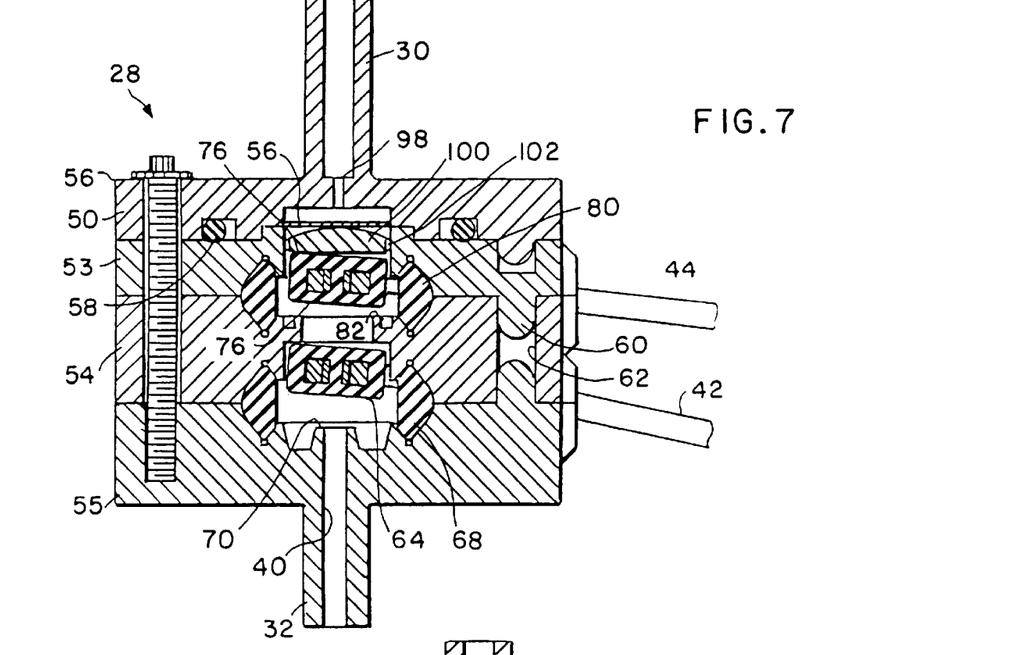
FIG. 7 is an enlarged vertical sectional view of a valve unit forming a portion of the float valve assembly, and showing primary and secondary valves in an open position.

The primary valve 36 is mounted between the lower housing plates 54, 55. This primary valve 36 comprises a banjo-type valve having a central valve disk or head 64 formed from a resilient or elastomeric material and coupled integrally by a radial arm 66 with an outer and generally concentric annular seal ring 68 seated coaxially along the flow path 40 and captured between the housing plates 54, 55. The valve head 64 is positioned along the flow path 40 to overlie an annular primary valve seat 70 through which water flow to the outlet fitting 32 is regulated.

Figure 4:
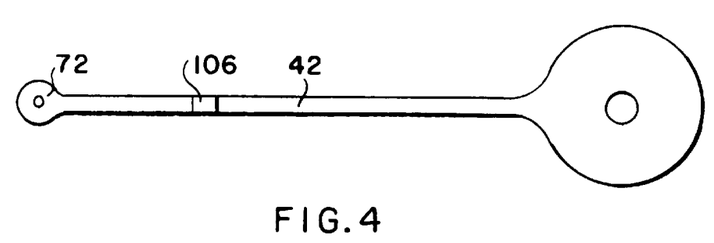
FIG. 4 is a plan view of a float arm for use in the float valve assembly.
Figure 5:
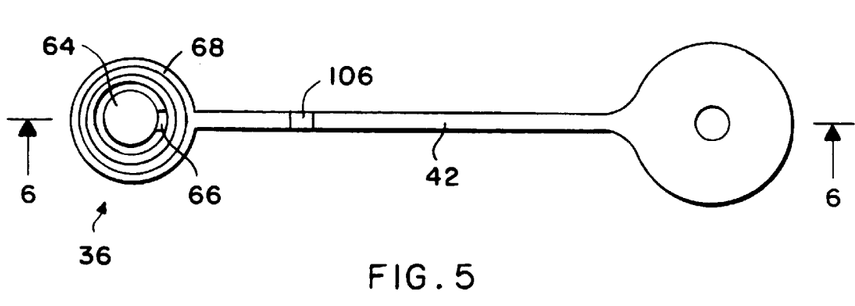
FIG. 5 is a plan view of the float arm of FIG. 4, assembled with a banjo-type valve.
Figure 6:
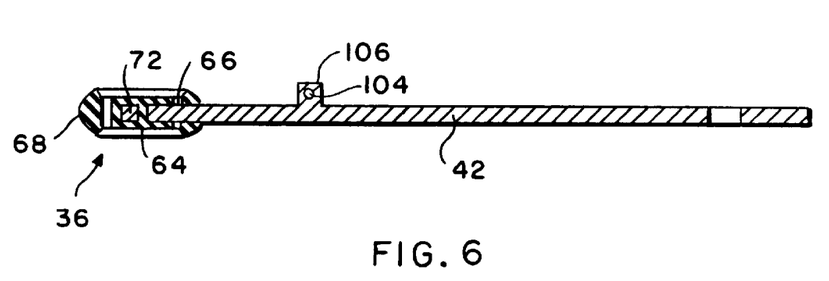
FIG. 6 is a longitudinal vertical sectional view taken generally on the line 6—6 of FIG. 5.

The float arm 42 associated with the primary valve 36 has its inboard end terminating in a small ring 72, as shown in FIGS. 4 and 6. This inboard end ring 72 is secured to the primary valve 36, preferably by comolding thereof within the central valve head 64, as viewed in FIGS. 5–7. From the valve head 64, the float arm 42 extends through the radial valve arm 66, comolded therein, and further through the seal ring 68 to extend radially outwardly from the valve unit 28 through a radially open slot 74 (FIG. 3) defined cooperatively by the lower two housing plates 54, 55. An outboard end of the float arm 42 is connected suitably to the primary float 46.

Figure 8:
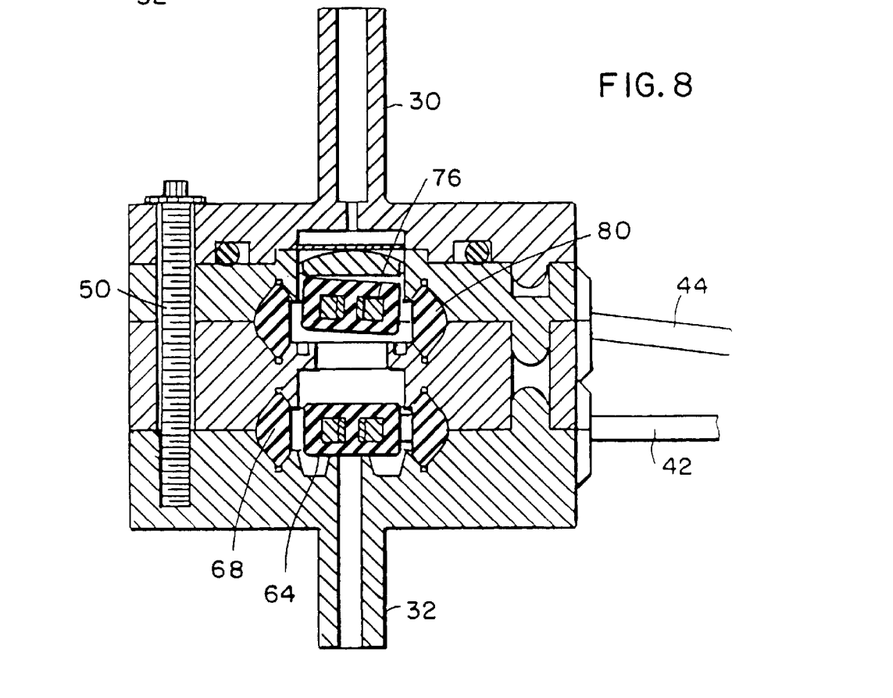
FIG. 8 is an enlarged vertical sectional view similar to FIG. 7, and depicting the primary valve in a closed position and the secondary valve in an open position.

In operation, the primary float 46 rises and falls according to the level of the purified water 18 within the reservoir 16. When the reservoir water level falls below a first predetermined level corresponding to a filled or substantially filled condition, the primary float 46 descends vertically so that the associated float arm 42 extends laterally outwardly and downwardly from the valve unit 28, as viewed in FIG. 7. In this orientation, the float arm 42 lifts the valve head 64 from the underlying valve seat 70 to permit water flow to the reverse osmosis module 14. However, when the water level within the reservoir 16 rises back to the first predetermined level, sufficient to cause the primary float 46 to lift the associated float arm 42 to a substantially horizontal attitude, as viewed in FIG. 8, the float arm 42 moves the valve head 64 downwardly to seat upon the valve seat 70 and thereby halt water inflow to the reverse osmosis module 14.

Figure 12:
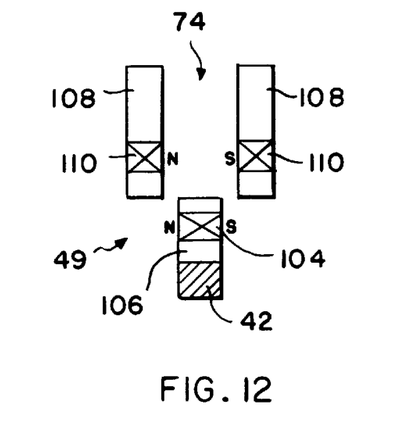
FIG. 12 is an enlarged fragmented vertical sectional view taken generally on the line 12—12 of FIG. 11, and depicting the over-center switch in an open position.
Figure 13:
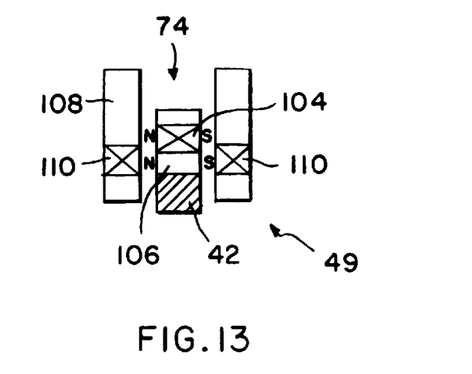
FIG. 13 is an enlarged fragmented sectional view similar to FIG. 12, but showing the over-center switch in a closed position.
Figure 14:
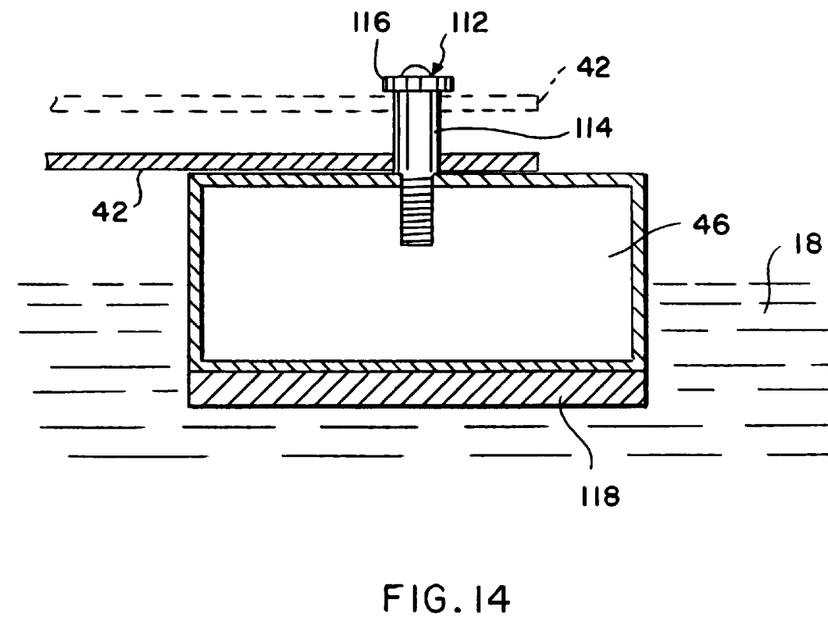
FIG. 14 is an enlarged fragmented vertical sectional view taken generally on the line 14—14 of FIG. 12.

Closure of the primary valve 36 in response to rising of the reservoir a water level to the first predetermined level, representing a substantially filled reservoir condition, occurs in a positive manner and with a substantially snap action by means of the over-center switch 49. In the preferred form as shown in FIGS. 3 and 11–13, the over-center switch 49 comprises a magnetic switch unit including a first magnet 104 mounted on an upwardly projecting post 106 or the like formed on or mounted upon the float arm 42, to position the first magnet 104 for vertical displacement within the radially outwardly open slot 74 formed in the housing plate 54. Radially outwardly protruding segments 108 (FIGS. 11–13) of the housing plate 54 respectively carry a pair of horizontally aligned second magnets 110. These second magnets 110 are oriented relative to the first magnet 104, so that like poles are presented toward each other as indicated in FIGS. 12 and 13. Alternately, the second magnets 110 may be mounted on alternative structure such as a suitable mounting bracket or the like supported in a fixed position relative to the movable float arm 42, as by mounting onto the valve unit housing or onto the structure of the reservoir or other suitable stationary structure.

As the water level within the reservoir 16 rises to the substantially filled condition, the primary float 46 ascends to lift the outboard end of the float arm 42 in a manner moving the associated primary valve 36 progressively toward a closed position, as previously described. Lifting of the float arm 42 also lifts the first magnet 104 toward a horizontally aligned or on-center position between the second magnets 110. However, the magnetic repulsion forces attributable to alignment of like poles result in resistance to lifting of the float arm 42 as the magnets approach the on-center position (FIG. 12). These magnetic repulsion forces briefly resist further lifting of the primary float 46 and the float arm 42 while the reservoir 16 continues to fill with water, resulting in an increasing upward force applied via the float 46 to the float arm 42. Eventually, the rising water level applies a sufficient vertically upward force to the float 46, to carry the first magnet 104 to and past the on-center position, wherein the magnetic repulsion forces assist in carrying the first magnet 104 upward to an over-center position above the second magnets 110 as shown in FIG. 13. Such upward and over-center displacement of the first magnet 104 and the associated float arm 42 functions to close the primary valve 36 in a positive manner with a substantially snap action. Importantly, snap action positive closure of the primary valve 36 prevents the valve from hanging up in a slightly open position to permit continued water flow to the purification module 14, but at a low pressure which is insufficient for continued production of purified water and related continued filling of the reservoir. Moreover, in the upper over-center position as viewed in FIG. 13, the magnetic repulsion forces assist in retaining the primary valve in the positively closed position.

The primary float 46 is coupled to the outboard end of the associated float arm 42 in a manner permitting a limited degree of lost motion in a vertical direction, in order to accommodate the above-described snap-action positive closure of the primary valve 36. In particular, as shown in FIGS. 2, 3, 11 and 14, the primary float 46 is attached to the outboard end of the float arm 42 by means of a shoulder screw 112 or the like having an unthreaded slide shank portion 114 adjacent an enlarged head 116. As the water level rises toward the substantially filled condition, the float 46 bears against the underside of the float arm 42 as shown in solid lines in FIG. 14. However, when the above-described snap-action closure of the primary valve 36 takes place in response to rising water level, the outboard end of the float arm 42 is free to shift upwardly with minimal resistance along the shank portion 114 to the dotted line position shown in FIG. 14, spaced from the top of the float 46 and positioned at or near the underside of the screw head 116. At this point, with the primary valve 36 closed, further supply of purified water to the reservoir 16 is halted, to correspondingly halt further elevation of the primary float 46.

Subsequent dispensing of water from the reservoir 16 causes the water level therein to fall. Initially, such dispensing results in the primary float 46 descending with the falling water level until the shoulder screw head 116 engages the upper side of the float arm 42. In this position, the magnetic repulsion forces holding the primary valve 36 in the closed position will also retain the float 46 against further downward displacement with the descending water level. However, as the water level falls further, the portion of the float 46 disposed above the water surface increases to correspondingly increase the downward force applied to the float arm 42. Eventually, this downward force increases to a magnitude sufficient to overcome the magnetic repulsion forces and thereby cause the float arm 42 to descend and re-open the primary valve 36 with a snap-type action. Thereafter, the float 46 tracks the water level within the reservoir 16 for appropriate re-closure of the primary valve 36 upon refilling of the reservoir with purified water. In this regard, a weight 118 (FIG. 14) may be mounted at the bottom of the float 46, wherein the weight 118 is formed from a material such as polypropylene having a specific gravity near that of water, such that the weight has a substantially neutral buoyancy when submerged. When any significant portion of the weight 118 is suspended above the water surface due to suspension of the float 46 relative to a descending water level as described above, the weight applies a significant increase in the downward force applied to the float arm 42 to re-open the primary valve 36.

The secondary valve 38 is constructed and operates in a generally similar manner to the primary valve 36, except as detailed below. More particularly, the secondary valve 38 is mounted between the middle pair of housing plates 53, 54. This secondary valve 38 also comprises a banjo-type valve having a central valve disk or head 76 formed from a resilient or elastomeric material and coupled integrally by a radial arm 78 with an outer and generally concentric annular seal ring 80 seated coaxially along the flow path 40 and captured between the housing plates 53, 54. The secondary valve head 76 is positioned to overlie an annular secondary valve seat 82 through which water flow to the outlet fitting 32 can be regulated. The float arm 44 associated with the secondary valve 38 has its inboard end terminating in a small ring 84 which preferably is comolded within the central valve head 76 (FIG. 7) in the same manner as shown and described with respect to the primary valve 36. From the secondary valve head 76, the float arm 44 extends through the radial valve arm 78, also comolded therein, and further through the seal ring 80 to extend radially outwardly through a radially open slot 86 (FIG. 3) defined cooperatively by the housing plates 53, 54. An outboard end of the float arm 44 is connected in turn to the secondary float 48.

Figure 9:
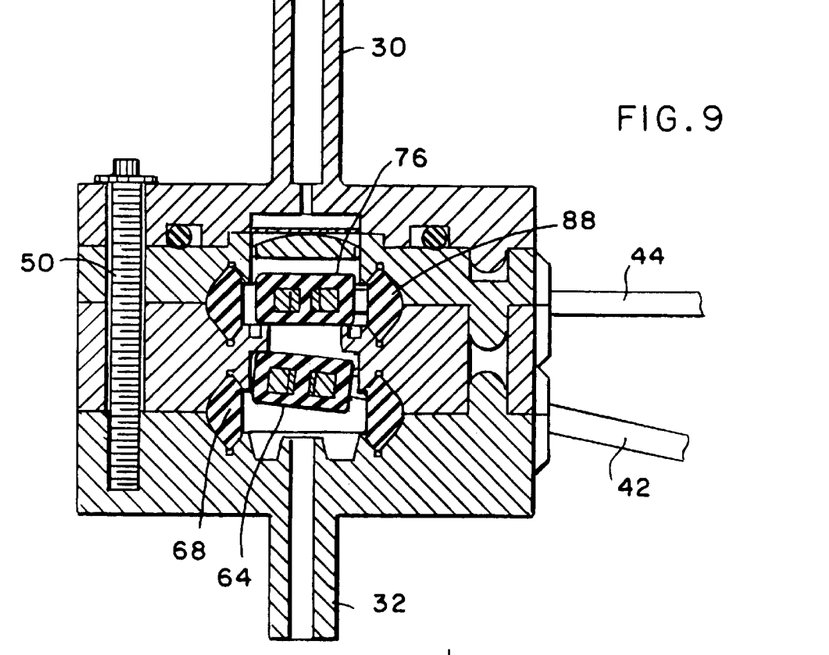
FIG. 9 is an enlarged vertical sectional view similar to FIG. 7, and showing the primary valve in an open position and the secondary valve in a closed position.

In operation, during normal on-off regulation of the reservoir water level by the primary valve 36, the rising and falling reservoir water level does not rise sufficiently to move the secondary valve 38 from a normal open condition. That is, as viewed in FIG. 7, the secondary float 48 is normally not elevated by the reservoir water level, whereby the associated float arm 44 normally extends angularly downwardly from the valve unit 28 to lift or cock the secondary valve head 76 to the open position. However, in the event of malfunction of the primary valve 36 or the primary float 46, the level of the purified water 18 within the reservoir 16 will rise to a second predetermined level slightly above the first level normally required to closed the primary valve head 64. When this occurs, the secondary float 48 will lift associated float arm 44 to a substantially horizontal attitude, as viewed in FIG. 9, so that the float arm 44 will move the secondary valve head 76 downwardly to seat upon the valve seat 82 and thereby halt water inflow to the reverse osmosis module 14.

In accordance with a further aspect of the invention, subsequent dispensing of water from the reservoir 16 resulting in a lowered water level within the reservoir does not automatically cause the secondary valve 38 to re-open. Instead, the open area defined by the secondary valve seat 82 is sufficiently large, so that the net downward closure force applied to the valve head 76 attributable to normal tap water pressure at the upper side thereof is sufficient to hold the secondary float 48 and the associated float arm 44 in a closed attitude despite subsequent water level descent. Accordingly, with this arrangement, while lowering of the reservoir water level below the second predetermined level permits movement of the primary valve 36 back to the open position, manual intervention for re-opening of the secondary valve 38 is required before pure water production can resume. This requirement for manual re-opening of the secondary valve serves as an alert that a system malfunction has occurred, and that remedial service is needed.

Figure 10:
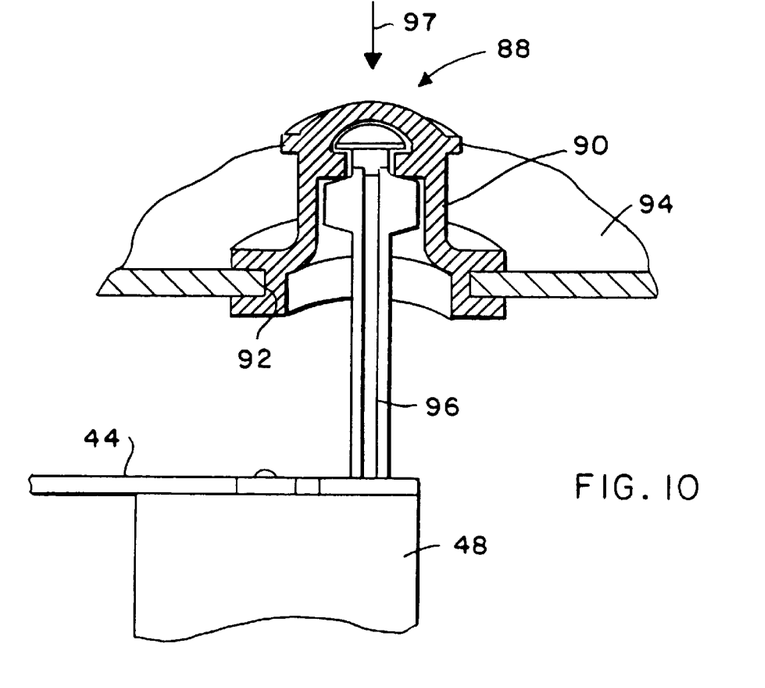
FIG. 10 is an enlarged fragmented perspective view illustrating a reset button for re-opening the secondary valve, subsequent to water level responsive closure thereof.
Figure 11:
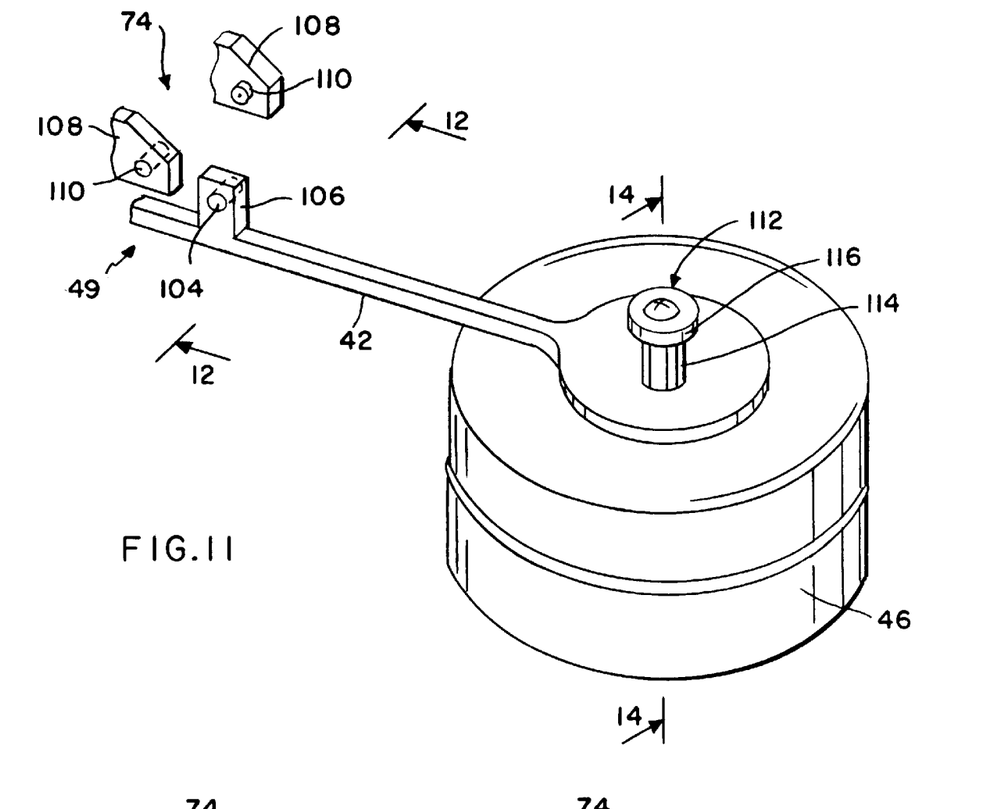
FIG. 11 is a fragmented perspective view illustrating an over-center switch for providing positive closure of the primary valve.

FIG. 10 shows a manual reset button 88 for use in manually re-opening the closed secondary valve 38. As shown, the reset button 88 comprises a resilient dome-shaped member 90 mounted within a reset port 92 formed in a lid or top wall 94 of the reservoir 16. A reset pin 96 is captured at the underside of the member 92 and protrudes downwardly within the reservoir to a position closely overlying the secondary float 48. When re-opening of the secondary valve 38 is required, manual depression of the button 88 as indicated by arrow 97 in FIG. 10 displaces the reset pin 96 downwardly against the secondary float 48, to push the secondary float back downwardly to a position wherein the float arm 44 lifts the secondary valve head 76 back to the normal open position. The resilient member 90 has sufficient inherent spring characteristics to retract upwardly to a normal position (as viewed in FIG. 10) following such reset depression.

In accordance with still further aspects of the invention, the valve unit 28 further includes a flow restrictor 98 in the form of an orifice formed in the upper housing plate 52 (FIG. 7) upstream from the primary and secondary valves 36, 38. This flow restrictor 98 has an internal diameter and length sufficient to control the water flow rate through the valve unit 28 to a relatively slow rate suitable for production of purified water, within a typical pressure range for tap water sources. In addition, a flow diverter 100 (FIG. 7) may be integrally molded within the housing plate 53, or otherwise suitably mounted therein, and comprises a diverter disk mounted centrally along the flow path 40 upstream from the secondary valve 38 and defining an annular passage in the form of an array of diverter ports 102 through which the tap water inflow can flow downwardly toward the secondary valve 38. With this construction, when the primary and secondary valves 36, 38 are both open for water flow to the reverse osmosis unit 14, the diverter disk 100 prevents the water downflow from undesirably impacting and displacing the secondary valve head 76 to the closed position. Instead, the diverter disk 100 causes the water to flow downwardly in a generally annular pattern about the periphery of the valve head 76 for flow through the open valve seat 82.

The float valve assembly 12 of the present invention thus provides for float activated mechanical operation of the series-mounted primary and secondary valves 36, 38 in response to changing water level within the storage reservoir 16. Primary on-off regulation of tap water flow is provided by the primary valve 36, with the secondary valve 38 acting as a safety backup to shut off the tap water inflow in the event of primary valve failure. The over-center magnet-type switch functions to insure rapid and positive full closure of the primary valve 36, with a snap-type action, in response to the reservoir water level rising to a substantially filled condition.

A variety of further modifications and improvements in and to the float valve assembly 12 of the present invention will be apparent to those persons skilled in the art. For example, while the over-center switch 49 has been shown and described for use with the primary valve 36, it will be recognized and understood that a second over-center switch may be employed with the secondary valve 38 to achieve positive snap-action closure thereof. Accordingly, no limitation on the invention is intended by way of the foregoing description and accompanying drawings, except as set in the appended claims.

What is claimed is:

1. A float valve assembly for regulating water inflow to a water purification system having a purification module and a reservoir for storing produced purified water, said float valve assembly comprising:

a valve unit including a housing defining a flow path having an inlet adapted for connection to a water source and an outlet adapted for connection to a purification module, and a primary valve mounted along said flow path, said primary valve being movable between open and closed positions respectively permitting and preventing water flow through said flow path to the purification module;

an elongated float arm having one end coupled to said primary valve;

a primary float;

means for connecting said primary float generally to an opposite end of said float arm to permit a limited range of vertical lost motion therebetween;

said primary float being responsive to the level of water within a reservoir for lifting said float arm for moving said primary valve from said open position toward said closed position when the water level rises to a first predetermined level, and for lowering said float arm for moving said primary valve from said closed position toward said open position when the water level falls below said first predetermined level; and switch means responsive to the water level rising within the reservoir substantially to said first predetermined level for positively displacing said float arm to move said primary valve to said closed position substantially with a snap action, said opposite end of said float arm being substantially free to displace vertically upwardly relative to said primary float within said limited range of lost motion upon snap action movement of said primary valve to said closed position.

2. The float valve assembly of claim 1 wherein said switch means comprises an over-center switch.

3. The float valve assembly of claim 1 wherein said switch means comprises a magnetic switch unit including a first magnet carried by said float arm for displacement in close proximity with at least one second magnet, said first and second magnets being oriented with like poles presented toward each other to generate magnetic repulsion forces resisting on-center alignment of said first and second magnets, said primary float lifting said float arm to displace said first magnet toward on-center alignment with said second magnet in response to rising water level within the reservoir, said primary float lifting said float arm with a sufficient force when the water level rises substantially to said first predetermined level to displace said first magnet over-center relative to said second magnet and to move said primary valve positively to said closed position.

4. The float valve assembly of claim 3 wherein said at least one second magnet is mounted in a fixed position relative to said first float arm.

5. The float valve assembly of claim 3 wherein said at least one second magnet comprises a pair of magnets mounted on opposite sides of said first magnet on said float arm.

6. The float valve assembly of claim 1 wherein said connecting means comprises a shoulder screw having one end threadably connected to said primary float and further including an unthreaded slide shank portion adjacent an enlarged head, said opposite end of said float arm being connected slidably along said unthreaded shank portion of said shoulder screw, whereby the length of said unthreaded shank portion defines the length of said limited range of lost motion.

7. The float valve assembly of claim 1 further including a weight mounted on a lower end of said primary float, said weight having a substantially neutral buoyancy in water.

8. The float valve assembly of claim 3 wherein said primary float applies a downward force to said float arm in response to a falling water level within the reservoir to move said first magnet downwardly and over center relative to said second magnet to re-open said primary valve.

9. The float valve assembly of claim 1 wherein said valve unit further includes a secondary valve mounted along said flow path and movable between open and closed positions respectively permitting and preventing water flow through said flow path to the purification module, and a secondary float coupled to said secondary valve and responsive to the level of water within the reservoir for moving said secondary valve from said open position to said closed position when the water level rises to a second predetermined level higher than said first level, and for allowing movement of said secondary valve from said closed position to said open position when the water level falls below said second predetermined level.

10. The float valve assembly of claim 1 wherein said valve unit is mounted within the reservoir.

11. The float valve assembly of claim 1 wherein said flow path is vertically oriented.

12. A float valve assembly for regulating water inflow to a water purification system having a purification module and a reservoir for storing produced purified water, said float valve assembly comprising:

a valve unit including a housing defining a flow path having an inlet adapted for connection to a water source and an outlet adapted for connection to a purification module, and a primary valve mounted along said flow path, said primary valve being movable between open and closed positions respectively permitting and preventing water flow through said flow path to the purification module;

an elongated float arm having one end coupled to said primary valve;

a primary float;

means for connecting said primary float generally to an opposite end of said float arm to permit a limited range of vertical lost motion therebetween;

said primary float being responsive to the level of water within a reservoir for lifting said float arm for moving said primary valve from said open position toward said closed position when the water level rises to a first predetermined level, and for lowering said float arm for moving said primary valve from said closed position toward said open position when the water level falls below said first predetermined level; and switch means responsive to the water level rising within the reservoir substantially to said first predetermined level for positively displacing said float arm to move said primary valve to said closed position;

said switch means comprising a magnetic switch unit including a first magnet carried by said float arm for vertical displacement in close proximity with at least one second magnet, said first and second magnets being oriented with like poles presented toward each other to generate magnetic repulsion forces resisting on-center alignment of said first and second magnets, said primary float lifting said float arm to displace said first magnet toward on-center alignment with said second magnet in response to rising water level within the reservoir, said primary float lifting said float arm with a sufficient force when the water level rises substantially to said first predetermined level to displace said first magnet over-center relative to said second magnet substantially with a snap action to move said primary valve positively to said closed position, said opposite end of said float arm being substantially free to displace vertically upwardly relative to said primary float within said limited range of lost motion upon said snap action movement of said primary valve to said closed position.

13. The float valve assembly of claim 12 wherein said connecting means comprises a shoulder screw having one end threadably connected to said primary float and further including an unthreaded slide shank portion adjacent an enlarged head, said opposite end of said float arm being connected slidably along said unthreaded shank portion of said shoulder screw, whereby the length of said unthreaded shank portion defines the length of said limited range of lost motion.

14. The float valve assembly of claim 12 further including a weight mounted on a lower end of said primary float, said weight having a substantially neutral buoyancy in water.

15. The float valve assembly of claim 12 wherein said primary float applies a downward force to said float arm in response to a falling water level within the reservoir to move said first magnet downwardly and over center relative to said second magnet to re-open said primary valve.

16. The float valve assembly of claim 12 wherein said at least one second magnet is mounted in a fixed position relative to said float arm.

17. The float valve assembly of claim 12 wherein said at least one second magnet comprises a pair of magnets mounted on opposite sides of said first magnet on said float arm.

18. The float valve assembly of claim 12 wherein said valve unit further includes a secondary valve mounted along said flow path and movable between open and closed positions respectively permitting and preventing water flow through said flow path to the purification module, and a secondary float coupled to said secondary valve and responsive to the level of water within the reservoir for moving said secondary valve from said open position to said closed position when the water level rises to a second predetermined level higher than said first level, and for allowing movement of said secondary valve from said closed position to said open position when the water level falls below said second predetermined level.

19. The float valve assembly of claim 12 wherein said valve unit is mounted within the reservoir.

20. The float valve assembly of claim 12 wherein said flow path is vertically oriented.

21. A float valve assembly for regulating water inflow to a reservoir, said float valve assembly comprising:

a valve unit including a housing defining a flow path having an inlet adapted for connection to a water source and an outlet adapted for connection in flow communication to a reservoir, and a primary valve mounted along said flow path, said primary valve being movable between open and closed positions respectively permitting and preventing water flow through said flow path to the purification module;

an elongated float arm having one end coupled to said primary valve;

a primary float;

means for connecting said primary float generally to an opposite end of said float arm to permit a limited range of vertical lost motion therebetween;

said primary float being responsive to the level of water within a reservoir for lifting said float arm for moving said primary valve from said open position toward said closed position when the water level rises to a first predetermined level, and for lowering said float for moving said primary valve from said closed position toward said open position when the water level falls below said first predetermined level; and switch means responsive to the water level rising within the reservoir substantially to said first predetermined level for positively displacing said float arm to move said primary valve to said closed position substantially with a snap action, said opposite end of said float arm being substantially free to displace vertically upwardly relative to said primary float within said limited range of lost motion upon snap action movement of said primary valve to said closed position.

22. The float valve assembly of claim 21 wherein said switch means comprises an over-center switch.

23. The float valve assembly of claim 21 wherein switch means comprises a magnetic switch unit including a first magnet carried by said float arm for displacement in close proximity with at least one second magnet, said first and second magnets being oriented with like poles presented toward each other to generate magnetic repulsion forces resisting on-center alignment of said first and second magnets, said primary float lifting said float arm to displace said first magnet toward on-center alignment with said second magnet in response to rising water level within the reservoir, said primary float lifting said float arm with a sufficient force when the water level rises substantially to said first predetermined level to displace said first magnet over-center relative to said second magnet and to move said primary valve positively to said closed position.

24. The float valve assembly of claim 23 wherein said at least one second magnet is mounted in a fixed position relative to said float arm.

25. The float valve assembly of claim 23 wherein said primary float applies a downward force to said float arm in response to a falling water level within the reservoir to move said first magnet downwardly and over center relative to said second magnet to re-open said primary valve.

* * * * *